Dec. 30, 1958     G. W. SCHATZMAN     2,866,653
FENDER AND FENDER SHIELD ASSEMBLY
Filed March 25, 1957     3 Sheets-Sheet 1
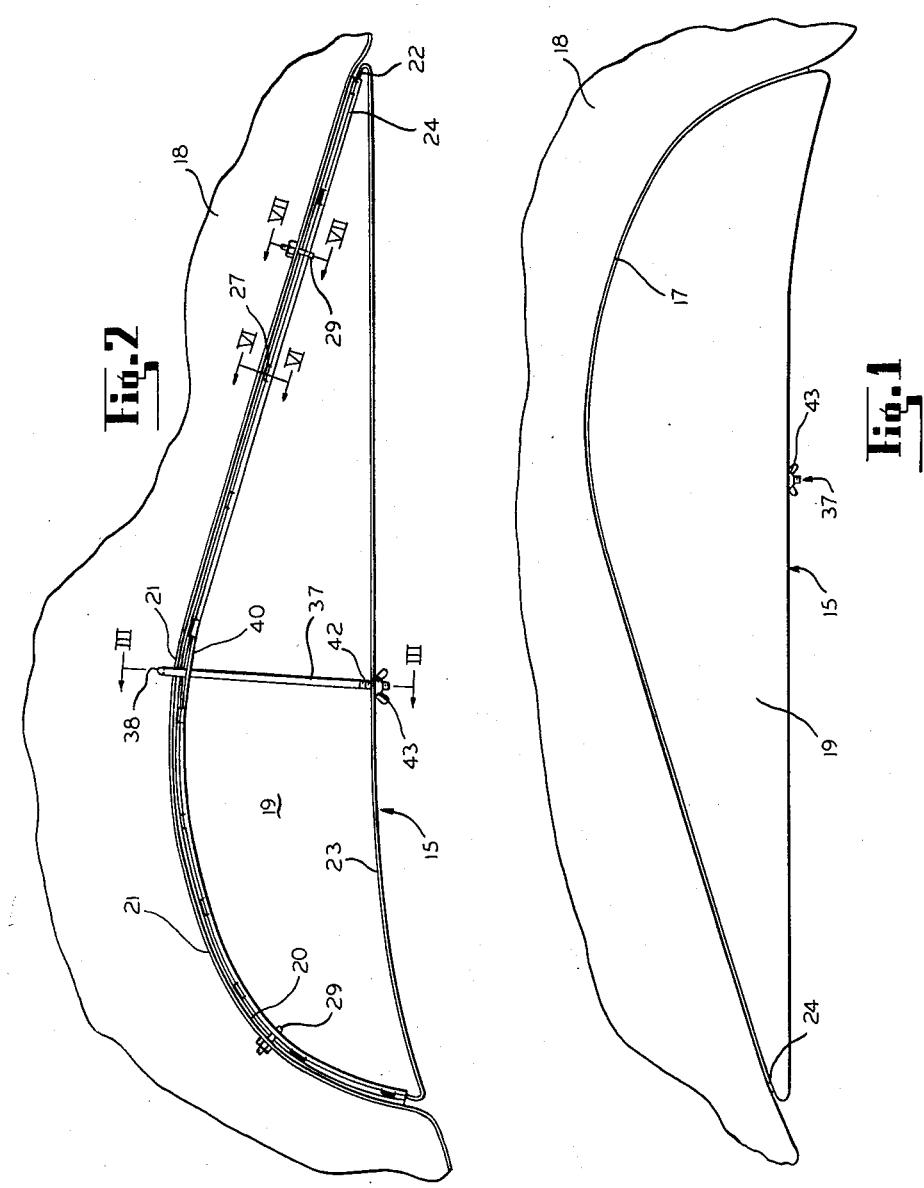
INVENTOR.
GEORGE W. SCHATZMAN
BY
ATTORNEYS Dec. 30, 1958 G. W. SCHATZMAN 2,866,653
FENDER AND FENDER SHIELD ASSEMBLY
Filed March 25, 1957 3 Sheets-Sheet 2
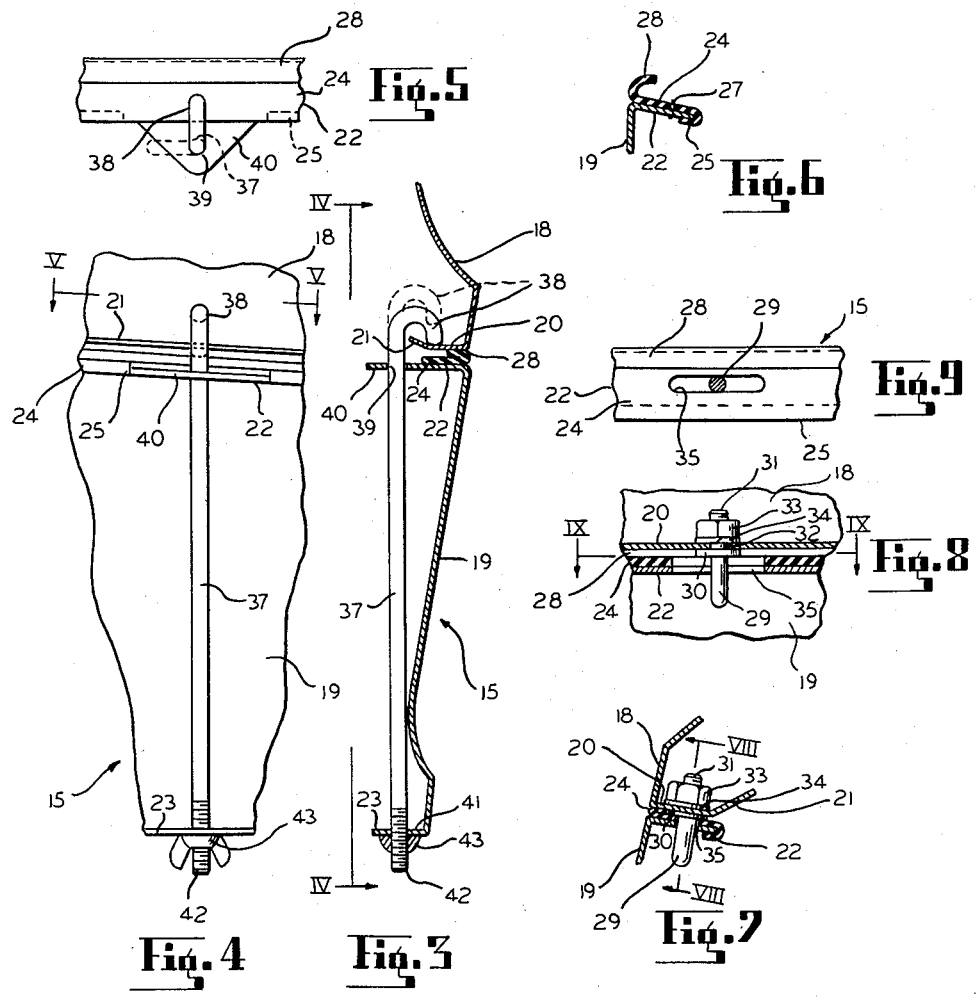
INVENTOR.
GEORGE W. SCHATZMAN
BY
ATTORNEYS Dec. 30, 1958     G. W. SCHATZMAN     2,866,653
FENDER AND FENDER SHIELD ASSEMBLY
Filed March 25, 1957     3 Sheets-Sheet 3
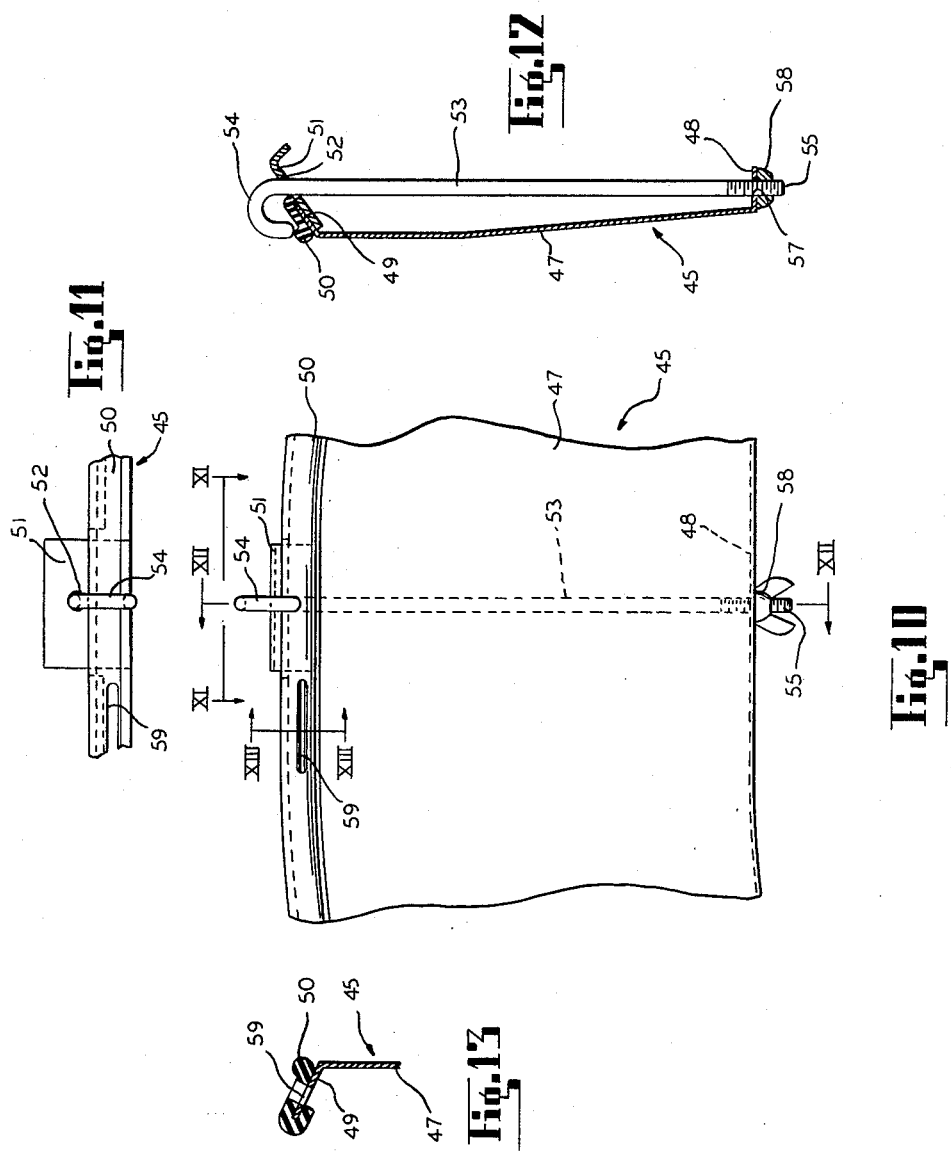
INVENTOR.
GEORGE W. SCHATZMAN
ATTORNEYS

United States Patent Office 2,866,653
Patented Dec. 30, 1958

2,866,653

FENDER AND FENDER SHIELD ASSEMBLY

George W. Schatzman, Detroit, Mich., assignor to Houdaille Industries, Inc., Buffalo, N. Y., a corporation of Michigan Application March 25, 1957, Serial No. 648,398

2 Claims. (Cl. 280—153)

The present invention relates to improvements in fender and fender skirt or shield assemblies, and more particularly concerns a novel manner of maintaining a fender and fender shield in assembled relation.

This application is a continuation-in-part of my application Serial No. 496,753 filed March 25, 1955.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance, and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of substantially covering the opening in the fender or vehicle body and which opening is provided for access to or removal of a vehicle wheel.

Furthermore, as the term "fender" shall hereinafter be employed, it refers to any form of wheel housing or fender in its broad sense, whether such fender be separable from the vehicle body part, partly separable from the vehicle body part, or actually an integral part of the vehicle body, and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield and novel means for attaching the same to a fender.

A further object of the invention is to provide novel structure for detachably securing a fender shield to a fender.

Yet another object of the invention is to provide improved means for quickly effecting and then maintaining the assembled relationship of a fender shield and a fender.

It is also an object of the invention to provide means of exceptionally economical and simple structure for maintaining the assembled relationship of a fender shield with a fender.

Other objects, features and advantages of the present invention will be readily apparent from the following detailed description of certain preferred embodiments thereof taken in conjunction with the accompanying drawings, in which:

Figure 1 is a fragmentary outer side elevational view of a fender and fender shield assembly embodying features of the invention;

Figure 2 is an inner side elevational view of the fender and fender shield assembly;

Figure 3 is an enlarged fragmentary vertical sectional detail view taken substantially on the line III—III of Figure 2;

Figure 4 is a fragmentary inner side elevational view of the inner side of the latch rod carrying central portion of the fender shield and the contiguous portion of the fender taken substantially in the plane of line IV—IV of Figure 3;

Figure 5 is a fragmentary top plan view of the fender shield taken substantially on the line V—V of Figure 4 but with the fender removed;

Figure 6 is a fragmentary enlarged sectional detail view taken substantially on the line VI—VI of Figure 2;

Figure 7 is a fragmentary enlarged sectional detail view taken substantially on the line VII—VII of Figure 2;

Figure 8 is a fragmentary sectional detail view taken substantially on the line VIII—VIII of Figure 7;

Figure 9 is a fragmentary sectional detail view taken substantially on the line IX—IX of Figure 8;

Figure 10 is a fragmentary outer side elevational view of a slightly modified fender shield structure embodying the invention;

Figure 11 is a fragmentary top plan view taken substantially in the plane of line XI—XI of Figure 10;

Figure 12 is a vertical sectional detail view taken substantially on the line XII—XII of Figure 10; and Figure 13 is a fragmentary sectional detail view taken substantially on the line XIII—XIII of Figure 10.

Referring to Figures 1 and 2, a fender shield 15 is constructed and arranged to be supported in substantially closing relation to a wheel access opening of a fender 18. In the present instance, the fender shield 15, which comprises a panel body 19 of suitable material such as sheet metal, plastic or the like, is of generally tear drop shape with a front end portion of substantially larger dimension than the trailing or rear end portion, generally complementary to the shape of the wheel access openings 17.

Defining the wheel access opening 17, at least, is an inturned marginal reinforcing and finishing fender flange 20 (Figs. 2 and 3) which is provided, at least in the upper central portion of the wheel access opening 20 with an angular generally upwardly and inwardly directed terminal flange portion 21.

Defining the upper and forward continuous edge portions of the fender shield panel 19 is an inturned reinforcing flange 22 complementary in linear shape to the inturned fender flange 20 and in assembly opposable in generally face-to-face relation thereto so that the outer faces of the fender shield panel 19 and the fender 18 about the wheel access opening can be disposed in substantially flush alignment. At the bottom margin of the fender panel 19 the inturned flange 22 merges with an inturned reinforcing flange 23 of the fender shield in such a manner that the fender shield is provided entirely about its margins with inturned flange reinforcement to provide a substantially stiff fender shield panel structure.

In order to provide a cushioned, rattle free and substantially dirt sealed joint between the fender shield panel 19 and the fender, the fender shield flange 22 is provided with a sealing and cushioning gasket 24 (Figs. 3 and 6) hooked onto the inner edge portion of the flange 22 as shown at 25, secured against displacement from the flange 22 as by means of respective staples 27, and provided at its forward margin with a flexible turned back take up flange portion 28.

Means are provided enabling application of the fender shield 15 into assembled relation with the fender 18 within the wheel access opening 17 by a relative upwardly planar movement, that is by moving the fender shield 15 while in upright position upwardly into assembled relation with the fender. To this end, a plurality of retaining pins or lug members 29 are provided to project from the fender flange 20 into the wheel access opening for engagement with the fender shield flange 22 to afford proper orientation of the fender shield to lie substantially flush on its outer face with the outer face of the fender about the wheel access opening 17, and also to hold the fender shield against displacement either inwardly or outwardly relative to the fender. In the form of the invention shown in Figure 2, there are two of the projecting pin members 29, one located near the rear end, diminishing portion of the fender shield and the other being located in the front end portion of the wheel access opening, as best seen in Figure 2. Each of the pin members 29 may be identical and therefore a description of one will suffice for the other.

Referring to Figures 7, 8 and 9, each of the pin members 29 has an intermediate collar 30 engageable against the underside of the fender flange 20 while a threaded head portion 31 of the pin projects up through a suitable aperture or hole 32 punched or drilled in the fender flange 20. A retaining nut 33 is screwed onto the head 31 and draws the shoulder flange 30 of the pin tight against the fender flange 20, while a lock washer 34 may be interposed in clamped, nut-locking relation between the nut 33 and the upper face of the fender flange 20.

Receptive of the depending pin 29 in each instance is a suitable slot 35 which is dimensioned transversely relative to the fender shield flange 22 for freely but substantially closely engaging the pin 29 so as to maintain the aligned substantially flush face relationship of the fender shield to the fender. In the circumferential or linear direction with respect to the fender flange 22, the pin receiving slot 35 is substantially elongated for accommodating reasonable assembly tolerances, and more particularly for facilitating some swinging movement of the fender shield about a horizontal axis normal to its plane during assembly or removal of the fender shield relative to the fender.

By having one of the aligning and retaining pin members 29 located adjacent the rear end portion of the fender shield and on an axis tilted convergently toward a vertical axis through the fender shield, and by having the pin member 29 adjacent the front end of the fender shield 15 tilted convergently toward the axis of the rear end pin member 29 substantially as shown in Figure 2, the fender shield is held substantially against canting or tilting out of position about a horizontal axis therethrough when the fender shield is held up against the fender flange 20. This disposition and relationship of the locating and retaining pins 29 also facilitates assembly of the fender shield with the fender since normally the wider front end portion will be lifted upwardly ahead of the narrower and thereby lighter rear end portion of the fender shield, with the fender shield then rocked upwardly into final engagement at its rear end portion with the fender.

For retaining the fender shield 15 in vertical position within the wheel access opening 17 and also assisting in maintaining the fender shield against inward or outward displacement is a hook rod latch member 37 which is provided with a retaining hook head 38 on its upper end portion which is retainingly engageable over the upturned terminal marginal portion 21 of the fender flange 20, with the downwardly projecting terminus of the hook head engageable in the reentrant juncture corner between the flange terminal 21 and the body of the flange 20 as best seen in Figure 3, while the inner side of the hook substantially where it joins the main body or shank of the rod member 37 closely opposes the inner edge of the flange terminal 21. Thereby, inward or outward displacement or substantial shifting of the hook head 38 relative to the fender flange 20 is substantially precluded.

The construction and relationship of the hook rod latch member 37 to the fender 15 is such that for assembly or removal of the fender shield 15 the latch rod member can be releasably swung and moved to a position wherein it will clear the fender flange 20 and more particularly the terminal portion 21 thereof, and in the assembled relationship of the fender shield with the fender the latch rod member 37 can be manually swung to interhooked relationship of the hook head 38 with the fender flange and then tightened into retaining engagement with the fender flange. For this purpose, the rod latch member 37 is preferably straight below the hook head 38 and adjacent to and immediately below the hook head is slidably reciprocably and rotatably guided within a journal aperture or eye 39 in an ear-like flange bracket portion 40 which may be an integral extension of the fender shield flange 22 and projects inwardly from the inner edge of such flange, as best seen in Figures 3 and 5. At its lower end portion, the latch rod member 37 is journaled in a journal aperture 41 provided therefor in the lower marginal inturned fender shield flange 23 in alignment with the journal aperture 39. A threaded lower end portion 42 on the latch rod member 37 projects down through the journal aperture 41 and has secured threadedly thereon a wing nut 43 by which the latch member can be readily loosened for release or tightened for retaining, latching relation to the fender.

In applying the fender shield 15 to the fender, the fender shield is lifted up into the wheel access opening 17 while the latch head 38 is swung to one side as shown in dash outline in Figure 5. After the locating and retaining pin members 29 have been received in their respective socket apertures 35, the latch member 37 is swung outwardly into overlying relation to the fender flange portion 21 in an elevated position as shown in dash outline in Figure 3 and is then allowed to drop or is pulled down so as to make firm engagment with the fender flange 20. Finally, the wing nut 43 is tightened up to effect a firm upward pull or thrust of the fender shield toward and into engagement with the fender flange 20. It will be observed that the fender shield latch member 37 is located substantially centrally of the longitudinal dimension of the fender shield 15 and thus cooperates efficiently with the retaining and locating pin members 29 in maintaining the fender shield against inward or outward displacement, while also holding the fender shield effectively against vertical displacement.

Removal of the fender shield 15 is easily effected by loosening the wing nut 43, pushing the latch member 37 upwardly to swing the hook head 38 clear of the fender shield flange portion 21, whereafter the fender shield can be lifted downwardly away from the fender.

In the modification of Figures 10–13, a fender shield 45 is provided which in most respects is the same as the fender shield 15. To this end, the fender shield 45 includes a body panel 47 having along its lower margin a reinforcing inturned flange 48 and along its upper margin a generally inturned reinforcing flange 49. A cushioning and sealing gasket 50 is carried by the flange 49. In this instance, the upper marginal flange 49 is slanted upwardly and inwardly to engage in complementary relation with a similarly disposed fender flange defining the upper portion of an access opening.

Secured as by welding or the like to the underside of the fender shield flange 49 is a guide ear bracket 51 that projects inwardly therefrom and has therethrough an eye or journal aperture 52 through which extends rotatably and reciprocably slidably a latch rod 53 on the upper end portion of which is a retaining hook head 54. On its lower end portion the latch rod 53 has a series of threads 55, with such portion extending down through a journal aperature 57 in the lower marginal fender shield flange 48 and carrying a wing nut 58.

In its upper marginal flange 49 and extending through the gasket 50, is a plurality of locating and retaining pin receiving slots 59 similar to the slots 35 in the upper flange of the fender shield 15. In this instance, it will be observed that one of the pin receiving slots 59 is located adjacent to the latch guiding bracket flange 51 so as to receive a retaining and locating pin carried by the fender flange for thereby assisting in maintaining the upper portion of the fender shield in position on such fender. It will be understood, of course, that there will be pin receiving apertures 59 adjacent the opposite end portions of the fender shield 45 similarly as the case with the fender shield 15, even through the fender shield 45 may be of a somewhat different outline.

Mounting and removal of the fender shield 45 will be effected the same as described in connection with the fender shield 15, and the latch member 53 will be understood to function in the same manner as the latch member 37.

It will be understood that modifications and variations may be effected without departing from the scope of the novel concepts of the present invention.

I claim as my invention:

1. In a fender shield for disposition in substantially closing relation to a wheel access opening of a fender, a panel having on the upper and lower margins thereof respective inturned flanges, a bracket plate secured to the upper marginal inturned flange and having a journal aperture therethrough, the lower marginal flange of the fender shield having an aperture therethrough axially aligned with said bracket aperture, a rod latch member slidably journaled through said aligned apertures and having on the upper end portion thereof above said bracket a hook head for engagement with a fender shield flange, the lower end portion of said rod projecting below said lower marginal flange and having threaded thereon a wing nut for relatively drawing the fender shield and latch member in opposite directions incident to threading of the wing nut onto the threaded portion, said upper marginal flange having adjacent to said bracket an elongated aperture for reception therein of a locating and retaining pin of a fender with which the fender shield may be assembled.

2. In a fender and fender shield assembly, a fender having a wheel access opening of generally tear drop shape wider at one end than the other end and tapering toward said other end, a fender shield for disposition in substantially closing relation in said wheel access opening and of complementary shape, said fender having defining the outline of said wheel access opening an inturned flange, the fender shield having an inturned flange complementary to and generally face-to-face engageable with said fender flange, a locating and retaining pin carried by the fender flange depending into the wheel access opening adjacent the tapering end and extending on an oblique axis converging toward a vertical axis through the wheel access opening, a second locating and retaining pin carried by the fender flange at the wider end thereof and projecting convergently at a greater angle toward said vertical axis, the fender shield flange having slots elongated linearly of the flange and receptive of the respective pins as an incident to upwardly swinging movement of the fender shield into position in the wheel access opening, and latch means carried by the fender shield and engageable with said fender flange for holding the fender shield against axial displacement.

References Cited in the file of this patent

UNITED STATES PATENTS

| | | |
|---|---|---|
| 2,048,862 | Haltenberger | July 28, 1936 |
| 2,115,768 | Haltenberger | May 3, 1938 |
| 2,215,619 | Patrick et al. | Sept. 24, 1940 |
| 2,671,672 | Schatzman | Mar. 9, 1954 |

FOREIGN PATENTS

| | | |
|---|---|---|
| 441,843 | Great Britain | Jan. 20, 1936 |